United States Patent

Okabe et al.

[11] Patent Number: 6,110,063
[45] Date of Patent: Aug. 29, 2000

[54] TENSIONER LEVER DEVICE

[75] Inventors: Isamu Okabe, Hanno; Tadasu Suzuki, Higashimurayama, both of Japan

[73] Assignee: Tsubakimoto Chain Co., Osaka, Japan

[21] Appl. No.: 09/074,679

[22] Filed: May 8, 1998

[51] Int. Cl.[7] ............................................. F16H 7/08
[52] U.S. Cl. ................................. 474/111; 474/109
[58] Field of Search ......................... 474/16, 90–92, 474/108, 109, 110, 112, 113, 117, 133, 135, 138, 237

[56] References Cited

U.S. PATENT DOCUMENTS

| | | | |
|---|---|---|---|
| 4,177,689 | 12/1979 | Zeilinger et al. | 474/111 X |
| 4,832,664 | 5/1989 | Groger et al. | 474/111 |
| 4,881,927 | 11/1989 | Suzuki | 474/110 |
| 4,921,472 | 5/1990 | Young | 474/111 |
| 5,045,032 | 9/1991 | Suzuki et al. | 474/140 |
| 5,418,600 | 5/1995 | Genovese | 474/111 X |

FOREIGN PATENT DOCUMENTS

| | | | |
|---|---|---|---|
| 3738895 | 6/1989 | Germany | 474/109 |
| 1038657 | 8/1983 | U.S.S.R. | 474/111 |
| 1555569 | 4/1987 | U.S.S.R. | 474/109 |

*Primary Examiner*—David A. Bucci
*Assistant Examiner*—Marcus Charles
*Attorney, Agent, or Firm*—Dann, Dorfman, Herrell & Skillman, P.C.; Henry H. Skillman

[57] ABSTRACT

To reduce a sliding resistance of a tensioner lever of a transmission chain and to suppress any flapping vibration in a free span portion of the transmission chain, a tensioner lever (1,11) has a tensioner sprocket (2,12) disposed in registry with a bent portion of a transmission chain C having a minimum bent radius of curvature. The tensioner sprocket is pressed by the tensioner lever against the slack run of the transmission chain to form the bent portion, and a shoe member (3,13) is mounted between the tensioner sprocket and a proximal end (1', 11') of the tensioner lever to slidably guide the free span portion of the run.

5 Claims, 4 Drawing Sheets

TENSIONER LEVER DEVICE

FIELD OF THE INVENTION

The present invention relates to a tensioner lever for holding a proper tension of a transmission chain stretched over endlessly between a driving sprocket and a driven sprocket.

BACKGROUND OF THE INVENTION

In one conventional sprocket type tensioner lever device, as shown in FIG. 3, a tensioner sprocket is pressed against and meshed with a transmission chain rotatably mounted on a tensioner lever which cooperates with a transmission chain C stretched endlessly between a driving sprocket D and a driven sprocket F. In the tensioner, a lever L disposed alongside the slack run of the transmission chain has a pivoted proximal end LA supported oscillatably around a fixed shaft A and a pivoted free end LB pressed and urged toward a free span section of the slack run of the transmission chain C by a pressing and urging lever R of a tensioner T. A tensioner sprocket S rotatably mounted on the tensioner lever L is meshed with and pressed against the free span section of the slack run of the transmission chain C to properly hold a tension.

Another tensioner lever device is shown in FIG. 4. In this figure, a lever L' has a pivoted proximal end L'A which supports the tensioner lever L' oscillatably around a fixed shaft A, and an oscillating free end L'B is pressed and urged against a free span section of the slack run of a transmission chain C by a pressing and urging lever R of a tensioner T.

It is noted that a travel guide member G for the transmission chain is provided on the tension run of the transmission chain in each of the devices L and L'.

In the above-described prior art, in case of the sprocket type tensioner lever shown in FIG. 3, if the section of the slack run of the transmission chain (hereinafter called the free span section) between the driving sprocket and the driven sprocket is long, a flapping vibration of the chain tends to occur in the free span section, and noises caused by the vibration unavoidably occur. Further, in case of the sliding type tensioner lever shown in FIG. 4, the maximum face pressure is applied to the pressing and sliding surface L'F of the oscillating free end L'B in sliding contact with the bent portion having the minimum radius of curvature formed in the free span section of the slack run of the transmission chain C caused by the pressing action of the tensioner lever L' to increase a sliding frictional resistance, thus increasing a loss of the driving force and a wear loss of the sliding surface L'F.

SUMMARY OF THE INVENTION

In the present invention, the above-described problem was solved by an arrangement wherein a tensioner sprocket pressed against and meshed with a transmission chain is rotatably supported on a tension lever pressing portion in sliding contact with a bent portion having a minimum radius of curvature formed in a free span section of the slack run of the transmission chain caused by a pressing action of a tensioner lever, and a shoe member pressed against and in sliding contact with the transmission chain is provided between the tensioner sprocket and the pivoted proximal end of the tensioner lever.

Pressing repulsion of the transmission chain is applied primarily against the bent portion of minimum radius of curvature formed in the free span section of the slack run of the transmission chain by the pressing action of the tensioner lever and the face pressure of the tensioner lever. Therefore, the tensioner sprocket disposed on the tensioner pressing portion in sliding contact with the bent portion, and the sliding frictional resistance with respect to the transmission chain is reduced by the rotation of the tensioner sprocket. The shoe member is disposed on the tensioner lever pressing surface between the sprocket and the sliding proximal end of the tensioner lever to thereby guide and suppress any flapping vibration of the free span section between the tensioner sprocket and the driven sprocket.

BRIEF DESCRIPTION OF THE DRAWINGS

All of the objects of the present invention are more fully set forth hereinafter with reference to the accompanying drawings, wherein.

DESCRIPTION OF THE PREFERRED EMBODIMENTS

Figure 1:
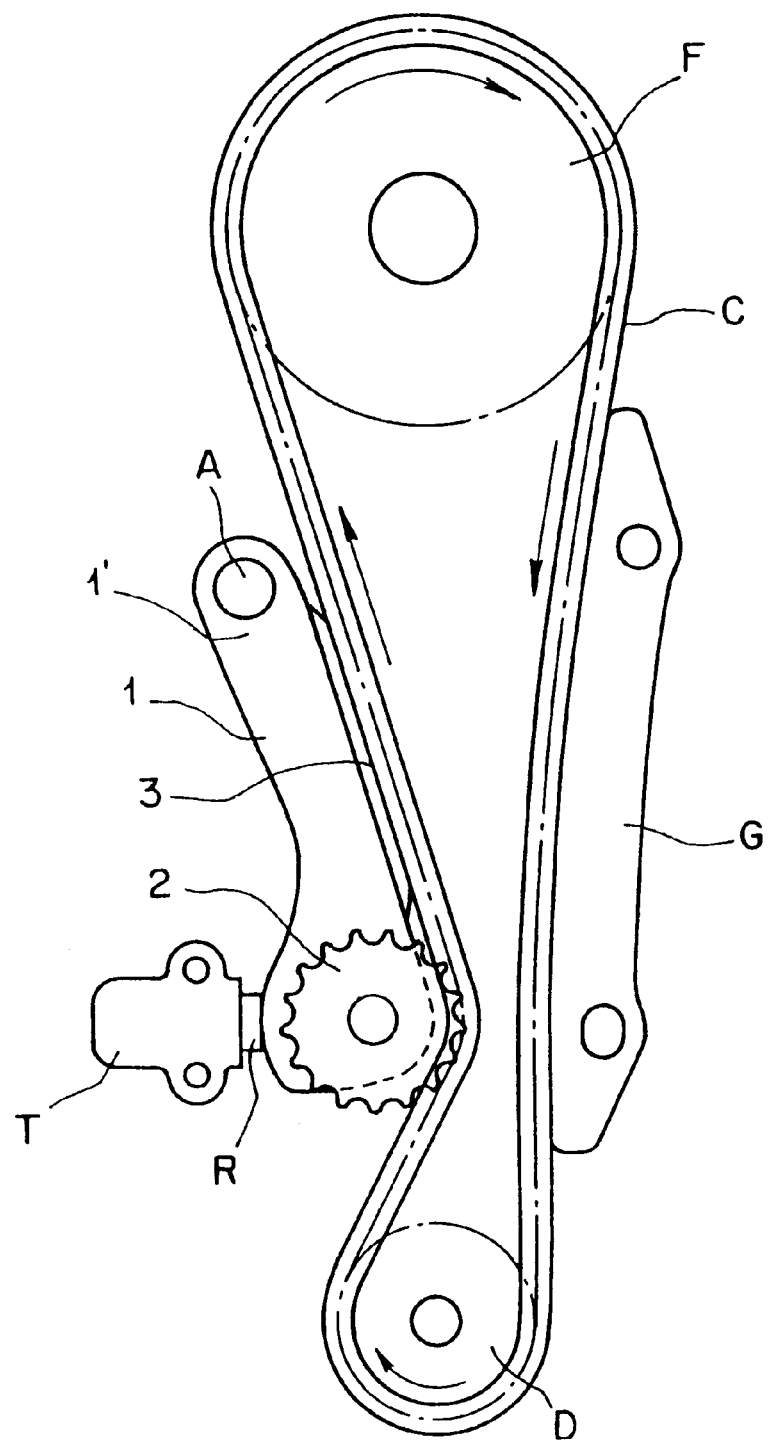
FIG. 1 is a schematic front view of a first embodiment according to the present invention.

FIG. 1 shows a first embodiment of the present invention. In a free span section of the slack run of a transmission chain C stretched endlessly between a driving sprocket D and a driven sprocket F, a tensioner lever 1 pressed and urged against the transmission chain C by a pressing and urging lever or plunger R of a tensioner T, and is supported oscillatably around a fixed shaft A at the proximal end 1' of a tensioner lever 1.

The tensioner lever 1 is pressed and urged toward the free span section of the slack run of the transmission chain C whereby the transmission chain C is pressed and bent to remove the slack of the transmission chain C. A tensioner sprocket 2 is supported on a tensioner lever at a pressing portion adjacent the free end of the lever 1. When pressed against the slack run of the chain C, the sprocket forms a bent portion whose bent radius of curvature is minimum. The minimum radius of curvature corresponds to the radius of the pitch circle of the teeth of the sprocket 2.

Further, the tensioner sprocket 2 is meshed and pressed against the slack run, whereby a free span portion between the tensioner sprocket 2 and the driven sprocket F is tensioned to be a straight line. Therefore, a shoe member 3 having a straight-line sliding surface in contact with the straight-line free span portion is provided between the tension sprocket 2 and a tensioner lever pivoted proximal end 1' whereby any flapping vibration of the transmission chain of the free E pan portion can be suppressed, and the straight-line sliding surface of the shoe member 3 can come into contact with the straight-line free span portion so as to guide the free span portion without applying a pressing force thereto, thus materially reducing the sliding resistance. As shown in FIG. 1, the teeth and the sprocket have a circular pitch line to which the flat guide portion is tangent to provide a smooth continuity from sprocket to the guide.

Figure 2:
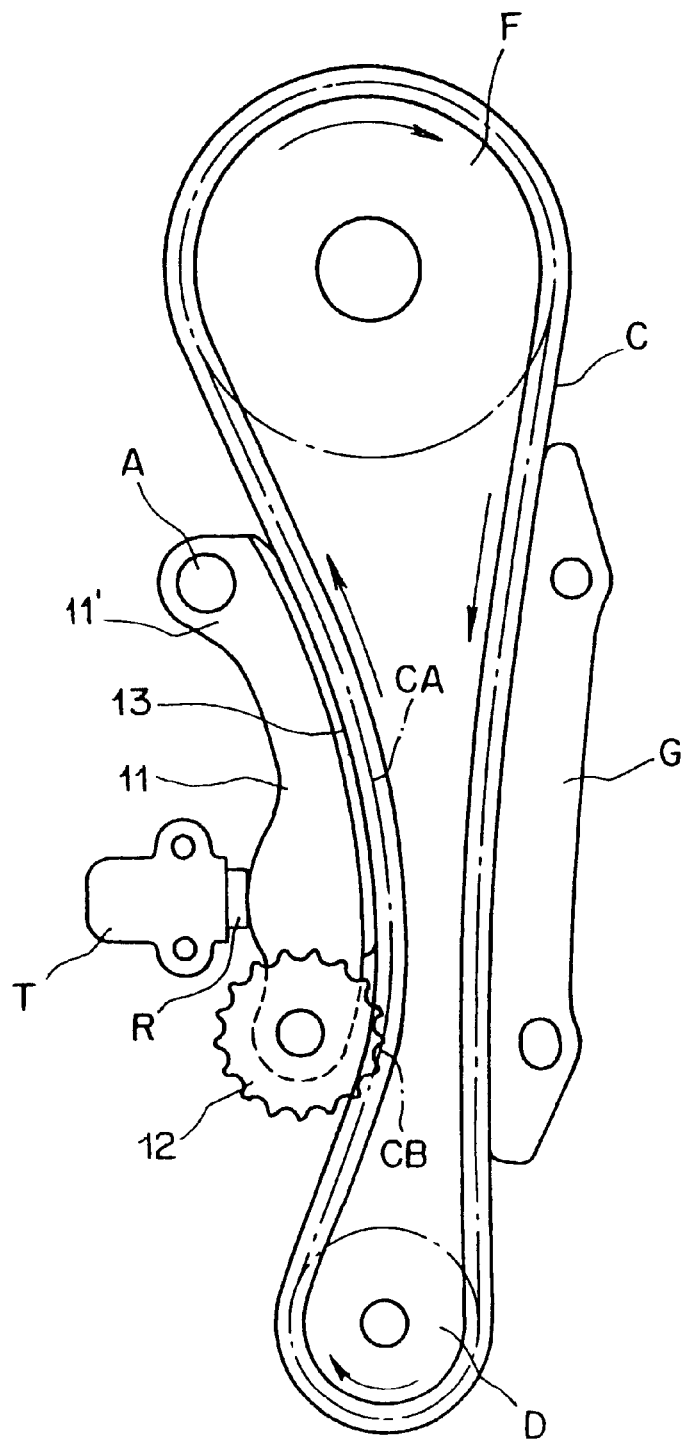
FIG. 2 is a schematic front view of a second embodiment according to the present invention.
Figure 3:
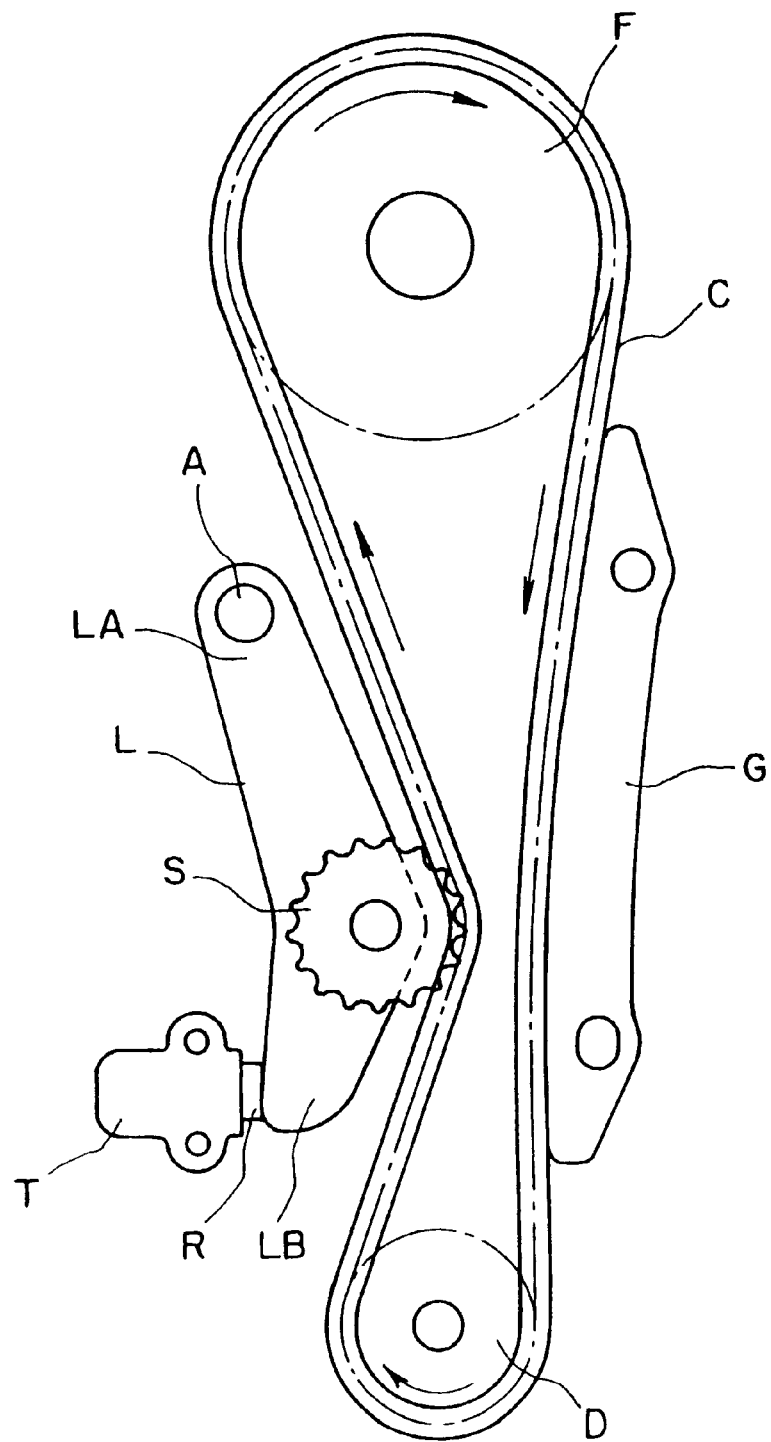
FIG. 3 is a front view of an example of a conventional device in which a tensioner sprocket is supported on a tensioner lever.
Figure 4:
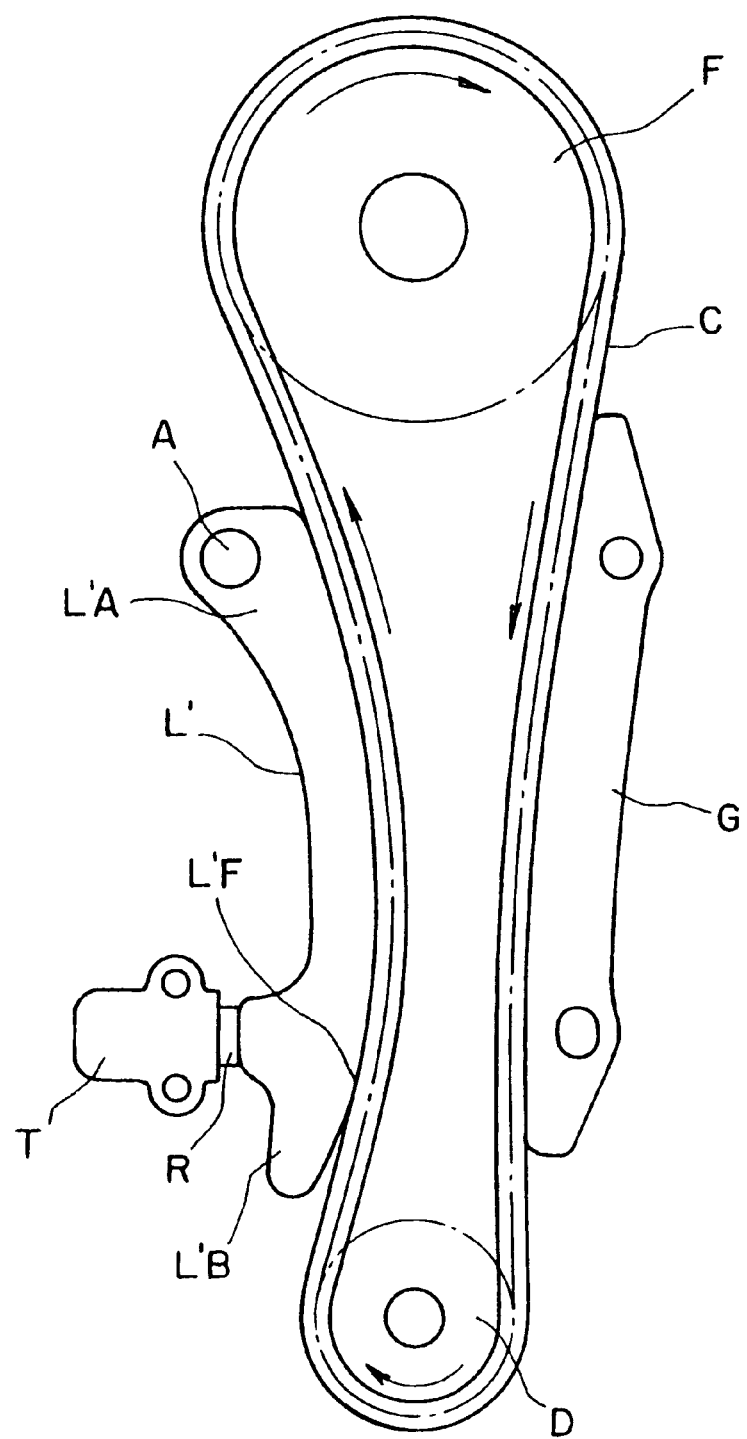
FIG. 4 is a front view of an example of a conventional device in which a shoe member is provided on a tensioner lever.

FIG. 2 shows a second embodiment of the present invention, which is different from the embodiment shown in FIG. 1 in that a free span section of the slack run of the transmission chain C between a tensioner sprocket 12 and a driven sprocket F is guided into a curved shape having a large radius of curvature by a shoe member 13 having a curved pressing surface. In this embodiment, the tensioner sprocket 12 presses against the slack run of the chain C to form a bent portion whose bent radius of curvature is minimum, as determined by the radius of the circular pitch line of the sprocket teeth about the turning axis of the sprocket. As in the embodiment shown in FIG. 1, the tensioner lever 11 is urged toward the slack run of the chain C by a tensioner T having a lever or plunger R pressing against the free end of the lever 11 so as to bias the lever 11 to pivot on the fixed shaft A toward the slack run.

In this case, it is desirable to relieve the pressing repulsion of the free span portion of the slack run of the transmission chain being exerted on the shoe member 13, that is, the pressing repulsion of the free span portion between the tensioner sprocket 12 and the pivoted proximal end 11' of the tensioner lever 11, to reduce the sliding resistance of the shoe member. To this end, it is necessary to lengthen the free span portion to increase the radius of curvature of the free span portion. Therefore, the bent portion of the transmission chain having a small radius of curvature is formed on the oscillating free end side of the tensioner lever 11, that is, adjacent the driving sprocket D side so that the maximum pressing repulsion exerts.

Thus, the tensioner sprocket 12 pressed against and meshed with the transmission chain C is rotatably supported on the pressing portion of the tensioner lever in sliding contact with the bent portion of the transmission chain having a small bent radius of curvature. This materially reduces the pressing repulsion exerted on the shoe member 13 for guiding the transmission chain C into the curved shape having a large radius of curvature, suppresses any flapping vibration of the transmission chain C and reduces the sliding resistance.

The curve of a sliding contact surface of the shoe member 13 is set so that a curved pitch line CA of the transmission chain C guided by the shoe member 13 smoothly continues to an circular pitch line CB of the bent portion of the transmission chain C pressed on and meshed with the tensioner sprocket 12 whereby the pressing repulsion of the transmission chain applied to the shoe member 13 is further relieved to further reduce the sliding resistance.

In the present invention, in the bent portion pressing repulsion of the transmission chain becomes maximum and the face pressure increases, when the tensioner lever presses the tensioner sprocket against the transmission chain to cause the bent radius of curvature to become minimum. Therefore, sliding resistance between the transmission chain and the tensioner lever is prevented by the rotation of the tensioner sprocket. Since the tensioner sprocket bears the maximum pressing repulsion of the transmission chain, the pressing repulsion of the transmission chain applied to the shoe member is relieved to reduce the sliding frictional force of the transmission chain being exerted on the shoe member, to lessen the wear loss of the shoe member, to enhance the durability of the shoe member, and to conserve the driving force of the transmission chain due to the reduction in sliding resistance.

Further, since the shoe member is provided between the tensioner sprocket and the pivoted proximal end of the tensioner lever, even if the free span portion between the tensioner sprocket and the driven sprocket is long, it is possible to suppress any flapping vibration of the transmission chain.

While particular embodiments of the invention have been herein illustrated and described, it is not intended to limit the invention to such disclosures, but changes and modifications may be made therein and thereto within the scope of the following claims.

We claim:

1. A tensioner lever for use with a transmission chain having a slack run with a bent portion having a minimum radius of curvature caused by a pressing action of the tensioner lever, said tensioner lever having a pivoted proximal end and an oscillating free end, said lever being pivotally supported on a fixed mounting shaft at said proximal end, said oscillating free end being pressed and urged toward said transmission chain run to properly hold a tension in the transmission chain, a tensioner sprocket on said lever adapted to be pressed against and meshed with the transmission chain, said sprocket being rotatably supported on said tensioner lever at a pressing position in registry with said bent portion of the slack run of the transmission chain, said pressing position being adjacent said oscillating free end of said lever, and a shoe member on said lever between said tensioner sprocket and said proximal end, said shoe being pressed against and in sliding contact with the transmission chain slack run.

2. A tensioner lever according to claim 1 wherein said sprocket has teeth with a circular pitch line having a radius corresponding to said minimum radius of curvature of said bent portion.

3. A tensioner lever according to claim 2 wherein said shoe has a guide surface to engage chain run, said guide surface meeting said circular pitch line to provide smooth continuity therebetween.

4. A tensioner lever according to claim 1 wherein said transmission chain is trained over a drive sprocket and a driven sprocket to provide a tension run on one side of the drive sprocket and the slack run on the other side of the drive sprocket, said fixed mounting shaft being adjacent the driven sprocket and the bent portion of the slack run being adjacent the drive sprocket, said shoe having a straight-line contact surface extending from said pressing position to said proximal end of the lever, and engaging the free span of the slack run between said bent portion and said driven sprocket.

5. A tensioner lever according to claim 1 wherein said transmission chain is trained over a drive sprocket and a driven sprocket to provide a tension run on one side of the drive sprocket and the slack run on the other side of the drive sprocket, said fixed mounting shaft being adjacent the driven sprocket and the bent portion of the slack run being adjacent the drive sprocket, said shoe having a curved sliding contact surface extending from said pressing position to said proximal end of the lever, and engaging the free span of the slack run between said bent portion and said driven sprocket, said curved contact surface having a radius of curvature greater than said minimum radius of curvature of said bent portion.

* * * * *

UNITED STATES PATENT AND TRADEMARK OFFICE
CERTIFICATE OF CORRECTION

PATENT NO. : 6,110,063

DATED         : August 29, 2000

INVENTOR   : Okabe et al.

It is certified that errors appear in the above-identified patent and that said Letters Patent is hereby corrected as shown below:

On the front page, insert the following:

--[30]   Foreign Application Priority Data
   May 12, 1997     [JP]   Japan......................9-120783--.

Signed and Sealed this

First Day of May, 2001

Attest:

NICHOLAS P. GODICI

*Attesting Officer*            *Acting Director of the United States Patent and Trademark Office*